Figure 7:
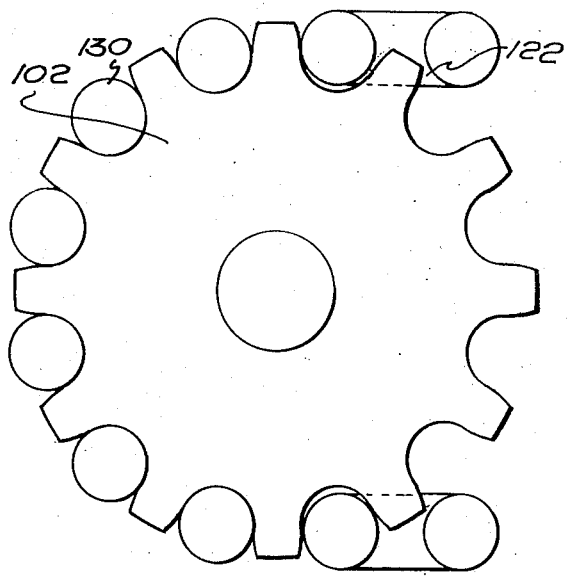

United States Patent [19]
Mercer, Jr.

[11] 3,809,253
[45] May 7, 1974

[54] BAR FEED MECHANISM

[75] Inventor: Austin Cartwright Mercer, Jr., Guiseley, England

[73] Assignee: Mercer Pneumatic Tools Limited, Yorkshire, England

[22] Filed: Aug. 2, 1972

[21] Appl. No.: 277,468

[30] Foreign Application Priority Data
June 16, 1972 Great Britain.................. 36471/72

[52] U.S. Cl..................................... 214/1.5, 83/2.5
[51] Int. Cl............................................. B23q 5/00
[58] Field of Search.......... 198/23, 24; 214/1.1, 1.2, 214/1.3, 1.4, 34, 1.5; 83/2.5, 2.7

[56] References Cited
UNITED STATES PATENTS
647,347   4/1900   Wellman et al..................... 214/34
980,181   1/1911   Asbury................................ 214/34
2,602,212  7/1952   Rosenberg......................... 214/1.5

FOREIGN PATENTS OR APPLICATIONS
188,669   4/1937   Switzerland....................... 214/1.4

Primary Examiner—Frank E. Werner

[57] ABSTRACT

A bar feed mechanism for a machine tool comprising a feed tube and a length of link chain which is adapted to the bore section of the tube such that the chain can be fed into the tube and once in the tube the chain is constrained by the tube whereby relative pivotings of the links is prevented and in effect the length of chain in the feed tube becomes a rigid rod usable for pushing the bar stock along the tube, and including feed means for feeding the chain into the tube at the end remote from which the bar stock is fed to the machine tool.

8 Claims, 15 Drawing Figures

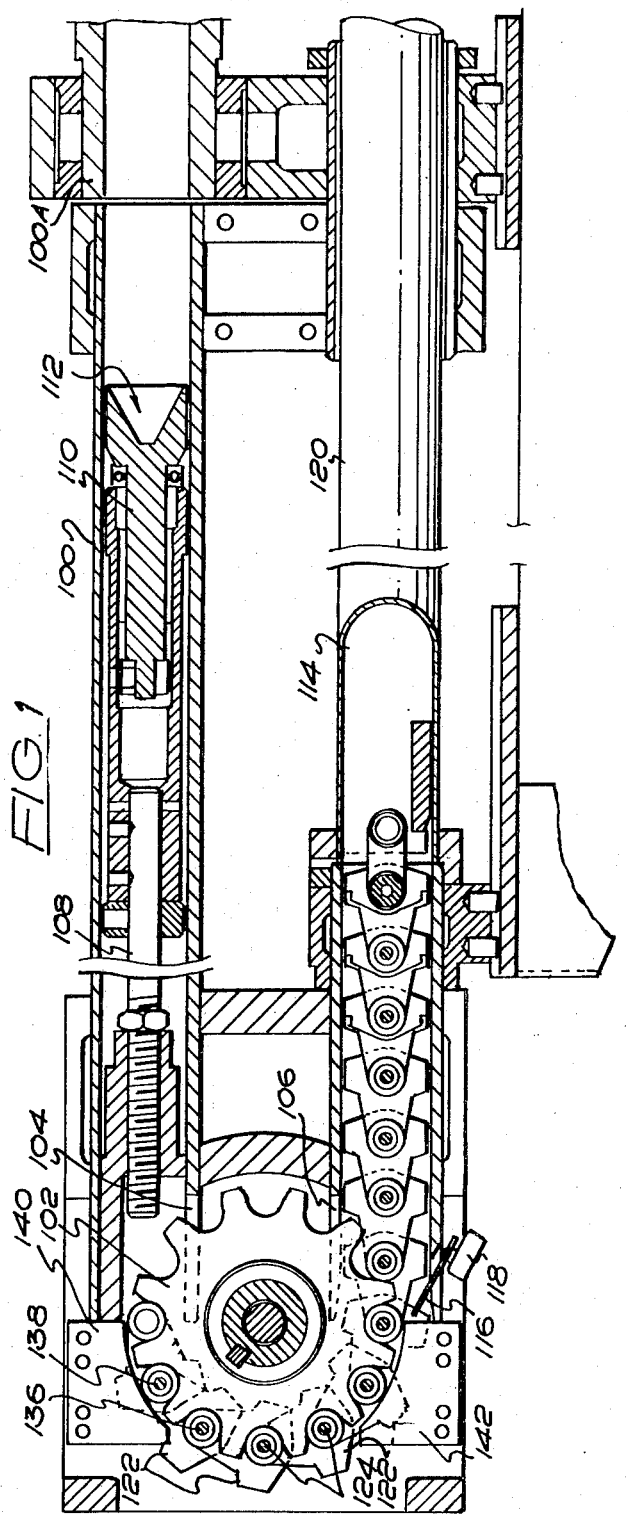

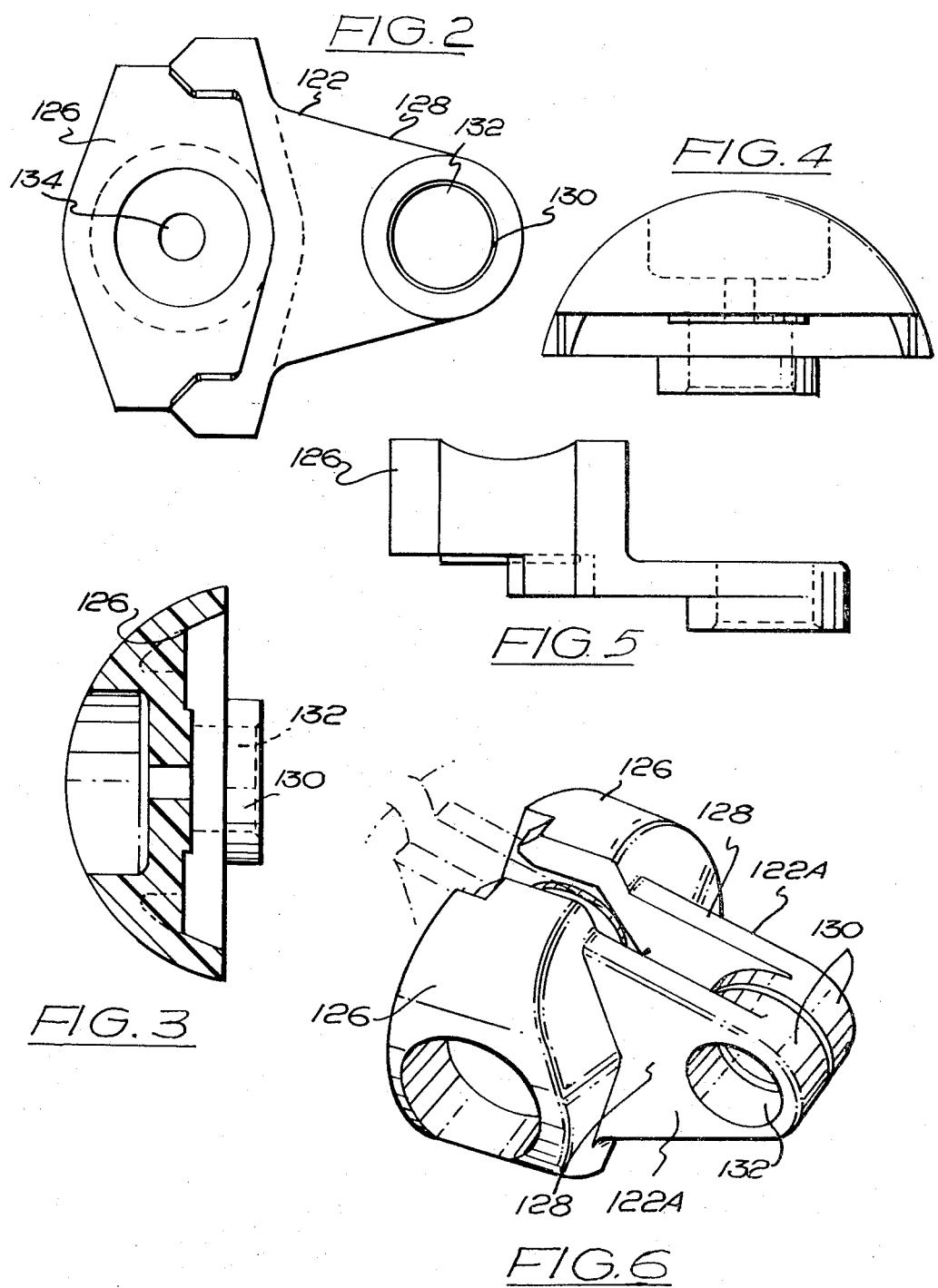

BAR FEED MECHANISM

This invention relates to bar feed mechanisms for machine tools, such as lathes which work on metal or other bar stock.

Bar stock fed to machine tools, in particular to an automatic lathe, may be a long as ten feet or more and the section thereof may be circular, square, rectangular, hexagonal or of other shape and when the stock is being worked on, it may be rotated at a speed as high as 2,000 r.p.m. As the stock is used up by the machine it is required to be repeatedly or continuously pushed or fed into the machine tool. The bar feed mechanism of a modern, high speed machine tool therefore requires to be carefully designed in order to perform its function.

Heretofore, bar stock feed mechanisms have included a feed tube through which the bar stock is fed by a pusher usually in the form of a long length of rigid rod. The pusher travels from one end to the other of the tube in feeding the bar stock and eventually travels into the region of the spindle of the machine tool to enable the maximum of the stock to be used. To enable the pusher to be moved along the tube the tube is required to be provided with an axial slot extending for the full length of the tube to enable a support member connected to a drive mechanism located outside the tube and to the pusher, to move the pusher along the inside of the tube.

A disadvantage of this bar feed mechanism which has arisen, largely due to the higher rotational speeds required by modern machine tools, is that the stock tends to deflect or whip whilst in the tube and it strikes the edges of the slot causing considerable noise, which of course can issue to the surrounding atmosphere through the slot. The problem is more acute when stock other than circular is being fed because the corners of the stock chatter noisily against the slot edges when the bar stock deflects during high speed rotation.

An object of this invention is to provide a bar feed mechanism for a machine tool whereby the provision of a slot in the feed tube is not necessary.

According to the invention there is provided a bar feed mechanism for a machine tool comprising a feed tube and a length of link chain which is adapted to the bore section of the tube such that the chain can be fed into the tube and once in the tube the chain is constrained by the tube whereby relative pivotings of the links is prevented and in effect the length of chain in the feed tube becomes a rigid rod usable for pushing the bar stock along the tube, and including feed means for feeding the chain into the tube at the end remote from which the bar stock is fed to the machine tool.

It will be understood that the feed tube need have no longitudinal slot and the omission of such slot leads to avoidance of the drawbacks as aforesaid.

Each chain link is made up of two identical and symmetrically disposed link halves, each link defining a boss which locates between spaced portions of the adjacent link in the chain, and the said link and adjacent link being pivotally interconnected for pivotal movement about the axis of said boss, said link halves of each link defining a round section which is adapted to the feed tube bore.

The link halves of each link preferably define a cylindrical portion of the link and which is adapted to the bore of the feed tube.

The link halves are preferably of a plastics material such as nylon or polypropylene which has self-lubricating characteristics.

The pivot axes between adjacent links of are preferably defined by pivot pins or rods interconnecting the links.

There may be a storage tube for the chain, which storage tube lies parallel to the feed tube, in which case the drive means includes a drive sprocket around which the chain is trained, the drive sprocket lying such that the axes of the feed and storage tubes lie tangentially to the sprocket pitch circle diameter and the ends of such tubes lie adjacent or on such pitch circle diameter. Thus, at the commencement of feed, the bar stock is placed in the feed tube, the majority of the chain lies in the storage tube, an end of the chain lies round the sprocket, and the adjacent extremity lies in or in register with the end of the feed tube, or carries an adaptor which lies in such end.

To feed the stock, the sprocket is rotated either manually or by means of a suitable prime mover which may be coupled for automatic operation in sequence with the operation of the machine tool to which the stock is being fed, and the chain is pushed into the feed tue wherein it in effect becomes a rigid push rod pushing the stock to the machine tool.

The storage tube may be of any suitable length or may be in two sections lying parallel to one another, in which case an idler wheel to guide the cahin between the sections would be required.

When the stock is used up the chain can be retracted from the feed tube by rotating the drive sprocket in reverse.

For each of the sprockets of the feed mechanism, there may be one or more curved guides which serves or serve to maintain the chain on the sprocket as it passes therearound.

Where the chain links are each made up of identical, symmetrical halves as aforesaid, the links are preferably such that the sprocket latch engage between said spaced portions and the bosses lie between adjacent teeth. The profile of each tooth of the sprocket is made up of a dedendum portion radially inwardly of a pitch circle of the teeth and an addendum portion located radially outwardly of said pitch circle, said dedendum portion being defined by a circular arc common to adjacent teeth of the sprocket, having its centre on the said pitch circle and terminating at each end of the arc at said pitch circle, and said addendum portion being constituted by a circular arc of opposite curvature to the dedendum portion and having its centre co-incident with the centre of the dedendum portion of the opposite side of the tooth, the radius of the dedendum portion being adapted to the radius of the boss of each link.

With the arrangements described, the minimum overall length required for operation of the bar feed mechanism is less than that which would be required for a conventional bar feed mechanism of the same capacity using a rigid bar pusher, because the minimum length required for the conventional mechanism is the length of the tube plus the length of the pusher bar, whereas the approximate mimimum length required for the arrangements described is the length of the feed tube plus the radius of the sprocket, and the sprocket radius will be considerably less than the length of a pusher bar.

Figure 8:
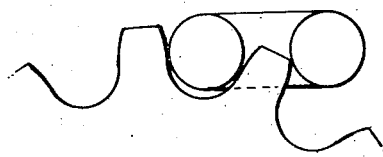
Figure 9:
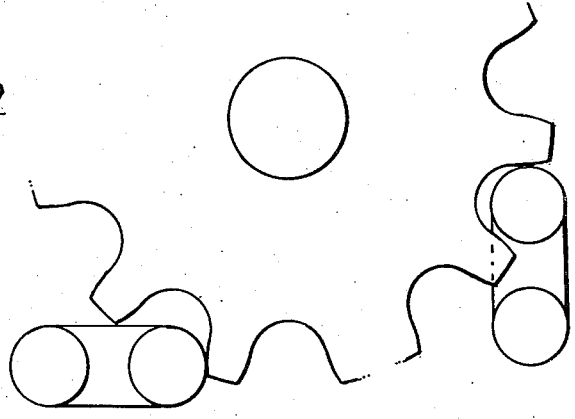

An embodiment of the invention is illustrated in the accompanying drawings, wherein;

FIG. 1 is a sectional elevation of a bar feed mechanism according to the embodiment of the invention;

FIGS. 2, 3, 4, and 5 are respectively a side elevation a sectional elevation taken on line VIII—VIII of FIG. 1, an end view and a plan of one of the symmetrical chain link halves of which two constitute each of the links of the chain shown in FIG. 1;

FIG. 6 is a perspective view of a single chain link as constituted by two chain link halves each as shown in FIGS. 2 to 5; and FIGS. 7, 8 and 9 show respectively and diagrammatically the configuration of the sprocket shown in FIG. 1, the kinematics of how each chain link is pushed off each tooth of the sprocket, and how each tooth of the sprocket is formed to give the kinematic effect illustrated in FIG. 8.

Referring to FIG. 1 it will be seen that the mechanism is provided with a feed tube 100 and a storage tube 120 which lie one above the other with their axes parallel and tangential to the feed sprocket 102 the ends of such tubes 100 and 120 adjacent the feed sprocket 102 being slotted as shown at 104 and 106 to allow the sprocket to travel in such slots.

In FIG. 1 only a restricted length of the link chain is shown and it will be seen to be connected at one end to the push bar 108 which lies in feed tube 100 and which is rigidly connected to the pusher 110 provided with a pusher stop support cone recess 112 in which the bar stop locates during use of the bar feed mechanism. At the other end the link chain is connected to a stop member 114 which is located in the storage tube 120 at all times. The stop member 114 serves to terminate the forward feed of the link chain by engaging the feeler arm 116 of a limit switch 118 and actuation of arm 116 effects automatically a termination of the drive to the sprocket 102. It is to be noted in FIG. 1 that for the purposes of illustration the link chain is shown as having a limited number of links. In actual practice there will be far more links than are illustrated and when the push rod 108 is in the position shown the stop member 114 will be located at the left hand end (not shown) of the feed tube 120 to give the maximum possible length of movement of the pusher 110. As regards the feed tube 100 it should be noted that in this example the feed tube is in fact in two sections namely the holder section 100 for the pusher and the main section 100A into which the bar stop is loaded. For this purpose the unit illustrated in FIG. 1 can be pivoted as a unit about the axis of storage tube 120 to expose the end of the main section of feed tube 100A whereby the bar stock can be loaded into the main section 100A. After loading of the bar the mechanism illustrated in FIG. 1 is pivoted back to the position shown so that the pusher 110 at the appropriate time can be pushed directly into the tube 100A for the feeding of the bar stop.

FIG. 1 shows the chain length as being made up of pivotally interconnected links 122 which are pivotally interconnected at axis 124.

Each of the links 122 is made up of two identical and symmetrically disposed link halves 122A of which one is shown in detail in FIGS. 2 to 5 whilst FIG. 6 shows two such links 122A in the dispositions which they take up in order to define a link 122.

Basically each link half 122A comprises a rear section 126 and a forward section 128. The rear section 126 defines generally speaking a semi cylindrical outer surface whilst the forward portion 128 is simply a web provided with a boss ring 130 defining an aperture 132 the axis of which coincides with the pivot axis 124 of the link in question.

To define a complete length the two identical halves 122A are placed together as shown in FIG. 6 so that their boss rings 130 are face to face with the apertures 132 coaxially aligned. By thus positioning the two halves the webs 128 of the respective half are spaced apart as shown in FIG. 6 and also the facing planar surfaces of the portions 126 are spaced apart by an amount approximately equal to the spacing between the outside surfaces of the two webs 128 as shown in FIG. 6. Thereby the two semi cylindrical portions 126 in effect define a cylindrical portion of the link but their opposed planar surfaces are spaced apart sufficiently so that the forward portions of the halves of the next following link can locate between the portions 126 again as shown in FIG. 6. The location of a metal bearing bush in the aligned apertures 132 and a passage of a pin through the bush and through suitable apertures 134 in the rear portions 126 establishes the pivotal connection between adjacent links, In FIG. 1 the bearing bushes are referenced 136 whilst the pins are referenced 138.

By this arrangement the sprocket wheel can engage between the webs 128 of each link and drive the link through the boss defined by the boss rings 130 of the link halves 122A as shown clearly in FIG. 1.

In addition guide or keeper plates 140 and 142 as shown in FIG. 1 can engage between the webs 128 of each link from the side opposite to that in which the sprocket 102 engers to ensure that the bosses 130 remain in firm and accurate engagement with the sprocket teeth.

Referring now to FIGS. 7, 8, and 9 these figures illustrate the manner of formation of the tooth profile for the sprocket to provide an extra advantage of this embodiment of the present invention. FIG. 7 shows the sprocket 102 and the small circles in engagement with the teeth represent the bosses 130 of the chain links. This figure also shows a link 122 after it has commenced its disengagement from the sprocket and its travel along the tube 100. It will be noticed that the forward boss 130 has already left engagement with the sprocket whilst the rearward boss is being pressed by the sprocket into the tube 100. FIG. 8 is a view similar to FIG. 7 except that three positions during the disengagement of the rearward boss relative to the tooth which pushes it into the feed tube are shown. It is noticed that these three positions are displaced angularly relative to the axis of the sprocket 102 but it is to be pointed out that in actual fact this illustration is for convenience and the disengagement from the tooth by the rearward boss of each link takes place over an angle of approximately 30° rotation of the sprocket and of course the link continues to travel in a straight line defined by the axis of the tube 100. It will be noticed that the contacting surfaces between the boss 130 and the tooth profile are always at right angles whereby there is no lateral loading or at least little lateral loading on the rearward boss and therefore there is no tendency for the link to pivot about the axis of the tube 100 into which it is being pushed. This optimum form of pushing the links into the tube is achieved by generating the tooth profile in a special manner which will now be explained with reference to FIG. 9. In this figure there are shown the adjacent profiles of two sprocket teeth 102A. The sprocket wheel 102 has a pitch circle 144 and the profile of each tooth is made up of a dedendum 146 located radially inwards of the pitch circle 144 and an addendum 148 located radially outwardly of said pitch circle. The dededum is defined by a circular arc whose radius lies on said pitch circle which is common to the profiles of adjacent teeth and which starts and finishes on said pitch circle whilst the addendum is defined by a circular arc of reverse curvature to the dedendum 146 and having the centre of curvature coincident with the centre of curvature of the next adjacent dedendum profile centre of curvature. The centres of curvature of the dedendum and addendum profiles illustrated in FIG. 9 as shown respectively at 150, 152 and 154. By so forming the profile the effect described with reference to FIG. 8 is achieved in a satisfactory manner and the cylindrical portions of the links of the chain are pushed exactly and axially into the tube 100 and when in such tube the links are prevented from any pivotal movement by virtue of the fact that the diameter of the cylindrical portion of each link is adapted to the internal diameter of the feed tube 100 and 100A and therefore links lying in such tube in effect become a rigid bar. The use of a cylindrical form for maintaining the links in a rigidly aligned condition has another advantage in that the cylindrical porton tends to wipe clean the inside of tubes 100 and 100A thereby keeping same clean and free from grit and other foreign matter.

The described embodiment has the advantage that it is not necessary to provide a very long pusher bar which would increase the length of the mechanism pivotally nor is it necessary to provide any slot in the feed tube. The minimum length required of the bar feed mechanism is basically the length of the feed tube plus the radius of the sprocket although in practice the mechanism will probably be slightly longer than this minimum dimension.

For the embodiment described we have found that constructing the links of synthetic "plastics" such as nylon or polypropylene has distinct advantages as regards the noise of operation of the mechanism and the wear resistance characteristics.

The automatic control of the sprocket in the embodiment is fairly simple and can be linked to the operation of the machine which is working on the bar stock to ensure that stopping and starting of the feed of bar stop takes place in synchronism with the operation of the machine. For this purpose suitable transmission between the prime mover of the sprocket may require to be provided such transmission for example including a clutch mechanism and gearing. Moreover the sprocket may be adapted simply for manual rotation or the sprocket may be adapted simply for manual rotation or the sprocket may be adapted for manual and/or power drive. The sprocket may be constructed for power drive with an override manual mechanism to enable an operator to feed the bar stop manually in the event for example of failure of the prime mover.

I claim:

1. A bar feed mechanism for a machine tool comprising a feed tube, a length of link chain which is adapted to the bore section of the tube such that the chain can be fed into the tube and once in the tube the chain is constrained by the tube whereby relative pivotings of the links is prevented and in effect the length of chain in the feed tube becomes a rigid rod usable for pushing the bar stock along the tube, and drive means for feeding the chain into the tube at the end remote from which the bar stock is fed to the machine tool, the chain having links which are pivotally interconnected, each chain link being made up of two identical and symmetrically disposed link halves, each link defining a boss which locates between spaced portions of the adjacent link in the chain, and the said link and adjacent link being interconnected for pivotal movement about the axis of said boss, said link halves of each link defining a round section which is slightly smaller than the inner diameter of the feed tube.

2. The bar feed mechanism according to claim 1, wherein the link halves of each link define a cylindrical portion of the link which is adapted to fit closely within the bore of the feed tube.

3. The bar feed mechanism according to claim 1, wherein the link halves are of a plastics material such as nylon or polypropylene which has self-lubricating characteristics.

4. The bar feed mechanism according to claim 1, wherein the pivot axes between adjacent links are defined by pivot pins or rods interconnecting the links.

5. A bar feed mechanism according to claim 1, wherein the drive means includes a sprocket wheel whose teeth engage the links so that the bosses are received between adjacent teeth as the sprocket turns.

6. The bar feed mechanism according to claim 5, wherein the feed tube is in two aligned lengths and one length can be pivoted with the sprocket and chain as a unit out of alignment with the other length about the axis of the storage tube, to enable bar stock to be loaded into said other length.

7. A bar feed mechanism according to claim 5, wherein the profile of each tooth of the sprocket is made up of a dedendum portion located radially inwardly of a pitch circle of the teeth and an addendum portion located radially outwardly of said pitch circle, said dedendum portion being defined by a circular arc common to adjacent teeth of the sprocket, having its centre on the said pitch circle and terminating at each end of the arc at said pitch circle, and said addendum portion being constituted by a circular arc of opposite curvature to the dedendum portion and having its centre coincident with the centre of the dedendum portion of the opposite side of the tooth, the radius of the dedendum portion being adapted to the radius of the boss of each link.

8. A bar feed mechanism for a machine tool comprising a feed tube and a length of link chain which is adapted to the bore section of the tube such that the chain can be fed into the tube and once in the tube the chain is constrained by the tube whereby relative pivoting of the links is prevented and in effect the length of chain in the feed tube becomes a rigid rod usable for pushing the bar stock along the tube, and including feed means for feeding the chain into the tube at the end remote from which the bar stock is fed to the machine tool, said chain having links which are pivotally interconnected, each link defining a boss which locates between spaced portions of the adjacent link in the chain, and the said link and adjacent link being pivotally interconnected for pivotal movement about the axis of said boss, panel feed means including a drive sprocket around which the chain is trained, the drive sprocket lying such that the axes of the feed tube tagentially to the sprocket pitch circle diameter and the ends of such tubes lie adjacent or on such pitch circle diameter, and wherein the profile of each tooth of the sprocket is made up of a dedendum portion located radially inwardly of a pitch circle of the teeth and an addendum portion located radially outwardly of said pitch circle, said dedendum portion being defined by a circular arc common to adjacent teeth of the sprocket, having its centre on the said pitch circle and terminating at each end of the arc at said pitch circle, and said addendum portion being constituted by a circular arc of opposite curvature to the dedendum portion and having its centre coincident with the centre of the dedendum portion of the opposite side of the tooth, the radius of the dedendum portion being adapted to the radius of the boss of each link.

* * * * *